United States Patent
Takahashi et al.

[15] 3,657,089
[45] Apr. 18, 1972

[54] PROCESS FOR PRODUCTION OF FIBROUS CARBIDES, NITRIDES OR BORIDES OF TITANIUM AND ZIRCONIUM

[72] Inventors: Takehiko Takahashi, 4-81, Ueda-Umemorizaka, Tenpaku-cho, Syowa-ku; Kozo Sugiyama, 1-8, Naruko-cho, Midoui-ku, both of Nagoya-Aichi, Japan

[22] Filed: Jan. 6, 1970

[21] Appl. No.: 1,026

[30] Foreign Application Priority Data

Jan. 7, 1969 Japan....................................44/1169

[52] U.S. Cl..................................204/164, 23/208, 23/204, 23/356, 204/177
[51] Int. Cl..................B01k 1/00, C01b 31/30, C01b 35/00

[58] Field of Search..............204/164, 177; 23/204 R, 208 A

[56] References Cited

UNITED STATES PATENTS

| | | | |
|---|---|---|---|
| 2,952,598 | 9/1960 | Suchet | 204/164 |
| 2,952,599 | 9/1960 | Suchet | 204/164 |
| 3,438,884 | 4/1969 | Juhola | 204/164 |

*Primary Examiner*—F. C. Edmundson
*Attorney*—Oblon, Fisher and Spivak

[57] ABSTRACT

A process for producing fibrous carbides, nitrides and borides of titanium or zirconium wherein the reaction is affected by subjecting a titanium or zirconium halide to an electrical discharge of 0.1mA to 20mA between electrodes with an alternating current of less than 3,000 cycles per second.

7 Claims, No Drawings

3,657,089

PROCESS FOR PRODUCTION OF FIBROUS CARBIDES, NITRIDES OR BORIDES OF TITANIUM AND ZIRCONIUM

BACKGROUND OF THE INVENTION

1. Field of Invention

This invention relates to a process for the production of fibrous carbides, nitrides or borides of titanium or zirconium by an AC discharge technique.

2. Description of Prior Art

Carbides, nitrides and borides of titanium or zirconium have been produced in the prior art by deposition processes whereby the materials were deposited from a gaseous state onto various substrates maintained at high temperatures. Usually, this was accomplished by admixing a carbon compound, a nitrogen compound or a boron compound with the halide of titanium or zirconium in a hydrogen atmosphere. There are many problems attendant with those prior art processes, however. For one, in order to grow fibrous crystals or so-called "whiskers" it was necessary to carefully control the deposition conditions. Moreover, since the substrate and the inner wall of the reactor were maintained at a very high temperature, more than ninety per cent of the deposition occurred on those portions in layered rather than whisker form, with the result that only a very small portion of the reactants formed the desired "whisker" product. Furthermore, since deposition occurred to a substantial extent on the inner wall of the reactor, it was necessary to frequently replace the reactor vessel. Another disadvantage of the prior art processes was that since the reaction temperatures normally are in the range of from 1,200° Centigrade to 2,500° Centigrade, very expensive equipment which could withstand these temperatures had to be used. Also, the power consumption necessary for those reactors was quite considerable.

These whiskers are usually grown to a length of about five mm over a period of several hours and normally only about one hundred such whiskers could be produced per square meter of substrate. Microscopically, the whiskers were in the shape of a hexigonal pyramid, which is a considerable drawback since whiskers having a circular cross-section are normally desired for practical use.

It is most desirable that the whiskers have an essentially constant diameter in the longitudinal direction and a sufficient length. Further, as far as the process of preparing these whiskers is concerned, it is desirable that they be grown at a specific position on the substrate, at a specific speed and through a continuous process, instead of growing them at arbitrary position on the substrate and at arbitrary speeds.

SUMMARY OF THE INVENTION

Accordingly, these and other disadvantages have now been resolved by a process for the production of fibrous carbides, nitrides or borides of titanium or zirconium whereby the halide of titanium or zirconium is reacted in the presence of an arc discharge of 0.1 to 20 mA between electrodes using an alternating current of less than 3,000 cycles per second. A mixed gas containing one or more of the gases of hydrogen, nitrogen, ammonia, carbon compounds, boron compounds and inert gas is also present with the titanium or zirconium halide depending upon the particular type of whisker desired.

The process according to the present invention is highly advantageous from an industrial standpoint since fibrous crystals can be rapidly grown between electrodes by affecting an AC discharge in a flow of an adequate reactant gas.

This method differs substantially from that known as Verneuil's method which is used to affect monocrystalline growth. According to that method, a plasma electric arc is used to affect the reaction whereas in the present invention the reaction is caused to occur at a limited range at the tip of one of the electrodes. Moreover, unlike the present invention, in Verneuil's method, powder of the carbide, nitride or boride is dissolved and formed into minute droplets which are subjected to prolonged solidification using seed crystals. In another well-known method using an electric discharge, a coil-like or plate-like electrode is used to bring about a layered growth of crystals, whereas in the present invention, the reaction occurs under certain specified conditions for the growth of fibrous crystals using certain AC frequencies, a specified range of discharge current and linear-shaped electrodes. There has been no reported literature which indicates the use of any electric discharge to produce fibrous crystals as in the present invention.

DETAILED DESCRIPTION OF PREFERRED EMBODIMENTS

Suitable titanium or zirconium halides include such materials as titanium tetrachloride or zirconium tetrachloride or those compounds which can be reacted to produce such materials. The halide is mixed with hydrogen or an inert gas such as argon and charged into a reactor. A mixture consisting of hydrogen, and a secondary reactant, for example, a carbon compound, such as a hydrocarbon, nitrogen, a nitrogen compound or a boron compound, such as boron trichloride, is admixed with the halide gas mixture at the entrance to the reactor. The reactor is charged at a linear velocity of about 1 to 30 cm./sec. The reaction chamber is maintained at a temperature of less than 1,000° Centigrade and preferably less than 600° Centigrade if the halide is titanium tetrachloride and less than 800° Centigrade if the halide is zirconium tetrachloride. The pressure within the system is held at approximately 1 mm. Hg. to 5 atmospheres pressure.

The composition of the reacting gases depends principally on the composition of the desired whisker. Depending upon which specific gases are used, the individual components of the gas may be present in the amounts of seven to 99 volume per cent of hydrogen, zero to 93 volume per cent of argon, 0.05 to 30 volume per cent of the halide of titanium or zirconium, 0.005 to one volume per cent of carbon compound or boron compound and 0.5 to 50 volume per cent of nitrogen compound.

In the reaction unit, one or more sets of electrodes may be disposed at each pole interval of 0.2 to 30 mm. The electrodes are desirably prepared from an electroductive material having a high melt-point such as tungsten or molybdenum which is impressed with an alternating signwave or rectangularwave current of less than 3,000 cycles and preferably between about 40 and 1,000 cycles at a voltage of between about 30 and 3,000 volts, preferably between 250 and 1,200 volts. The diameter of at least one of each set of electrodes is less than 2 mm. and preferably less than 0.1 mm. The electrodes are disposed in such a manner as to be shifted in vertical direction with the growth of fibrous crystals at their tips while preserving their pre-determined intervals. A discharge current flowing between each set of electrodes is less than 20 mA and desirably less than 3 mA. More preferably, the current passing between the electrodes is between 0.1 and 2 mA which is maintained by regulating the voltage or by adding resistors into series.

A fibrous crystal is grown rectilinearly at the maximum speed of 1.2 mm/sec. when a whisker having a diameter of 10 $\mu$ is desired. The fibrous crystals are held in straight lines connecting upper and lower poles due to the discharge current so that linear crystals having relatively constant diameters can be easily grown. Although fibrous crystals having a length of more than 5 cm. and a diameter of about 30 cm. to those having a length of more than 30 cm. and a diameter of about 10 cm. can be grown in this manner, to prevent the fiber from being shifted from the electric arc, when growing fibers of greater length, it is desirable to use appropriate guide wheels to prevent the fiber from being shifted from the electric arc due to the convection of the gas flow. Once the fibers have been grown to a pre-determined length, the circuit is disconnected and a slight impact will cause the crystals to drop from the substrate. Alternatively, the crystals may be mechanically scraped from the substrate and accumulated at the bottom of the container. The growth of new crystals may then be resumed by readjusting the electrodes to their proper intervals and impressing a voltage.

Waste gas may be discharged from an outlet at the bottom of the reactor and the unreacted titanium or zirconium halide may be separated from the product gases such as hydrogen halide and recycled back to the reactor.

According to X-ray photographs of the crystals grown according to the methods of the present invention, those fibers having a diameter in the range of 5 to 15 $\mu$ seem to be monocrystalline in structure, whereas fibers exceeding 20 $\mu$ in diameter appear to be polycrystalline in structure since the growth of minute crystals can be observed on both sides of the fibers. The breaking strength of these crystals have been measured as high as 72 kg./mm$^2$ at room temperature and 46 kg./mm$^2$ at 950° Centigrade.

In the process, according to the present invention, when a D.C. voltage is impressed across the electrodes, only the cathode reaches the necessary high temperature. Nevertheless, the rate of crystal growth is extremely slow. At the anode, on the other hand, although dendritic deposits of certain lower halides are grown rapidly due to electrostatic attraction, the temperature surrounding the anode is too low to yield any significant growth of the desired carbide, nitride or boride. This partially explains the significance of using alternating current of less than 3,000 cycles per second. When alternating current below that limit is used, a rapid growth of crystals is obtained due to the alternate reactions of deposition in the anode cycle and heating in the cathode cycle.

The size of the fibrous crystal obtained is determined primarily by the particular discharge current applied and secondarily by the composition of the mixed gas used and the spacing between the electrodes. Particularly strong fibrous crystals are obtainable by a discharge current of less than 1.5 mA., and electrode spacing of between 0.5 to 3 mm. and an AC frequency of between 50 to 500 cycles per second.

EXAMPLE 1

A quartz tube with a caliber of 30 mm. was kept at a temperature of 300° Centigrade by external heating. Six ml./sec. of hydrogen, sufficient to saturate the titanium tetrachloride and a mixed gas consisting of 3 ml./sec. of argon and 0.02 ml./sec. of methane were charged into the top of the quartz tube. A pair of molybdenum electrodes having a diameter of 0.1 mm. was placed in a tube at the top and bottom in such a manner that the pole interval therebetween was kept at 1.5 mm. An electric discharge was caused with a sine-wave alternating current of 300 cycles per second and 360 to 400 volts. The discharge current was 0.8 mA. Titanium carbide fibers with a diameter of 12 $\mu$ were grown on both electrodes at the speed of 0.2 mm./sec., dropping off as they reach the length of 30 mm. The breaking strength of these fibers at room temperature was 63 kg./mm$^2$.

EXAMPLE 2

Using the apparatus of Example 1, three pairs of electrodes were disposed in the reactor at each 1.5 mm. interval. Five hundred kΩ resistors were inserted into the external circuits of the upper electrodes and an alternating sine-wave current of 600 volts and 60 cycles per second was impressed with the other conditions of Example 1 remaining the same. An electric discharge was started as a current of 0.5 to 0.8 mA flowed through each circuit. The upper and lower electrodes were shifted upwardly and downwardly at the speed of 0.08 mm./sec. with the result that six fibers of titanium carbide having densities of between 25 to 60 mm. were grown simultaneously. The diameters of the fibers in this instance were between 15 and 22 $\mu$ and their breaking strengths at room temperature were between 22 and 48 kg/mm$^2$.

EXAMPLE 3

The upper half of the reactor used in Example 1 was modified into a double-tubed structure and 4 ml. per second of hydrogen and 0.02 ml. per second of nitrogen were charged into the inner tube while the outer tube was filled with a zirconium sponge. Three ml. per second of argon and 0.03 ml. per second of chlorine were applied to this layer. The two resultant gas flows were combined at the middle of the quartz tube, immediately reaching a discharge portion. The temperature of the discharge portion was kept at 550° Centigrade; the interval between the electrodes was set at 3 mm. A current having a rectangular wave of 20 cycles per second and 700 volts was used. The electric discharge was effected between 1.5 and 2.0 mA, with the result that zirconium nitride was grown at a speed of 0.5 mm. per second. The diameter of the fibers obtained was between 25 and 40 $\mu$ and their breaking strength at room temperature was 13 kg/mm$^2$.

EXAMPLE 4

The reactor used in Example 3 was charged with boron trichloride instead of nitrogen by charging the inner tube at the volicity of 0.015 ml. per second, with the other conditions remaining the same. When an alternating current of a sine-wave of 700 cycles per second and 550 volts was impressed and the electrodes set at an interval of 3 mm., a resultant discharge current of 0.4 mA was obtained. The gold colored fibrous crystals of zirconium boride grew at 0.15 to 0.20 mm. per second with a diameter of between 7 and 12 $\mu$ and a breaking strength at room temperature of 56 kg./mm$^2$.

Having generally described the invention, it will be readily apparent to those of ordinary skill in the art that many modifications and changes can be made without departing from the spirit or scope of the invention. Accordingly, what is desired to be covered by Letters Patent is:

What is claimed is:

1. A process for preparing inorganic fibers selected from the group consisting of titanium and zirconium carbides, nitrides, and borides which comprises admixing a halide of titanium or zirconium in a gaseous state with at least one gas of the group consisting of nitrogen, ammonia, a hydrocarbon and a boron halide and effecting reaction of said admixture by passing an electric discharge therethrough at a discharge current of 0.1 to 20mA and an alternating current of about 40 to 3,000 cycles per second, wherein the inorganic fibers are grown on each member of at least one pair of electrodes which are separated by a pole-to-pole interval of about 0.2 to 30 mm.

2. The process of claim 1 wherein said admixture additionally contains at least one gas selected from the group consisting of hydrogen and an inert gas.

3. The process of claim 1 wherein said reaction is effected at a temperature of less than 800° Centigrade when said halide is a zirconium halide and less than 600° Centigrade when said halide is a titanium halide.

4. The process of claim 1 wherein said halide is selected from the group consisting of titanium tetrachloride and zirconium tetrachloride.

5. The process of claim 1 wherein said inorganic fibers are rectilinearly grown on each member of at least one pair of electrodes at a maximum rate of about 1.2 mm./sec.

6. The process of claim 1 wherein the electrodes are separated by a pole-to-pole interval of about 0.5 to 3 mm.

7. The process of claim 6 wherein the discharge current is less than 1.5 mA and the AC frequency is between 50 to 500 cycles per second.

* * * * *